(12) United States Patent
Ohtomo et al.

(10) Patent No.: US 7,764,809 B2
(45) Date of Patent: Jul. 27, 2010

(54) SURVEYING METHOD AND SURVEYING INSTRUMENT

(75) Inventors: Fumio Ohtomo, Itabashi-ku (JP); Hitoshi Otani, Itabashi-ku (JP); Makoto Omori, Itabashi-ku (JP)

(73) Assignee: Kabushiki Kaisha TOPCON, Tokyo-to (JP)

( * ) Notice: Subject to any disclaimer, the term of this patent is extended or adjusted under 35 U.S.C. 154(b) by 655 days.

(21) Appl. No.: 11/070,750

(22) Filed: Mar. 2, 2005

(65) Prior Publication Data
US 2005/0195384 A1 Sep. 8, 2005

(30) Foreign Application Priority Data
Mar. 8, 2004 (JP) .............................. 2004-063833

(51) Int. Cl.
*G06K 9/00* (2006.01)
*G06K 9/40* (2006.01)
(52) U.S. Cl. .................. 382/106; 382/263; 382/266
(58) Field of Classification Search .................. 382/106, 382/199, 266
See application file for complete search history.

(56) References Cited

U.S. PATENT DOCUMENTS

| | | | | |
|---|---|---|---|---|
| 3,801,205 A | * | 4/1974 | Eggenschwyler | ............ 356/138 |
| 4,573,191 A | * | 2/1986 | Kidode et al. | ............... 382/106 |
| 5,231,678 A | * | 7/1993 | Takatori et al. | ............. 382/154 |
| 5,966,472 A | * | 10/1999 | Kataoka et al. | ............. 382/291 |
| 5,995,649 A | * | 11/1999 | Marugame | .................. 382/154 |
| 6,473,166 B1 | * | 10/2002 | Ohishi et al. | ............. 356/141.1 |
| 6,801,875 B1 | * | 10/2004 | Wolk et al. | ................... 702/158 |
| 7,031,525 B2 | * | 4/2006 | Beardsley | .................... 382/199 |
| 2001/0031068 A1 | | 10/2001 | Ohta et al. | ................... 382/103 |
| 2002/0057195 A1 | | 5/2002 | Yamamura | ................... 340/435 |
| 2003/0137510 A1 | * | 7/2003 | Massen | ....................... 345/420 |

FOREIGN PATENT DOCUMENTS

| | | |
|---|---|---|
| EP | 1 024 342 | 8/2000 |
| EP | 1 158 309 | 11/2001 |
| EP | 1 605 230 | 12/2005 |
| JP | 9-218020 | 8/1997 |

* cited by examiner

*Primary Examiner*—Vu Le
*Assistant Examiner*—Alex Liew
(74) *Attorney, Agent, or Firm*—Nields, Lemack & Frame, LLC (57) ABSTRACT

A surveying instrument, comprising an optical system for collimating a measuring point, a driving unit for performing scanning in a measurement range the optical system, a distance-measuring unit comprising a light wave distance measuring system, an image pickup unit for taking an image in the measurement range, an image processing unit for performing image processing to extract edges from the image picked up, and a control arithmetic operation unit for selecting a point near the edge as a measuring point on the image picked up and for controlling the distance-measuring unit to carry out surveying operation of the measuring point.

13 Claims, 8 Drawing Sheets

SURVEYING METHOD AND SURVEYING INSTRUMENT

BACKGROUND OF THE INVENTION

The present invention relates to a surveying instrument of non-prism type for 3-dimensional measurement.

When 3-dimensional data is to be surveyed on an object such as a building within a predetermined range, there have been disadvantages in the past in that much time was required and there was limitation in acquired amount of the surveying data because an operator must determine a measuring point and surveying operation must be carried out one point after another. By an automatic surveying instrument, in which surveying operation is automated, raster scanning is performed by measuring a predetermined range with fine pitch, and a vast amount of 3-dimensional surveying data can be collected more quickly than in the operation by the surveying operator. By putting together the vast amount of 3-dimensional data, 3-dimensional display can be achieved.

In a conventional type automatic surveying instrument, a great number of measuring points are required, and storage capacity of a storage device to store the data at the measuring points also must be large. In case unnecessary data is incorporated as measuring data, the continuity of the data may be lost, and the measurement must be repeatedly carried out in many cases.

Figure 12:
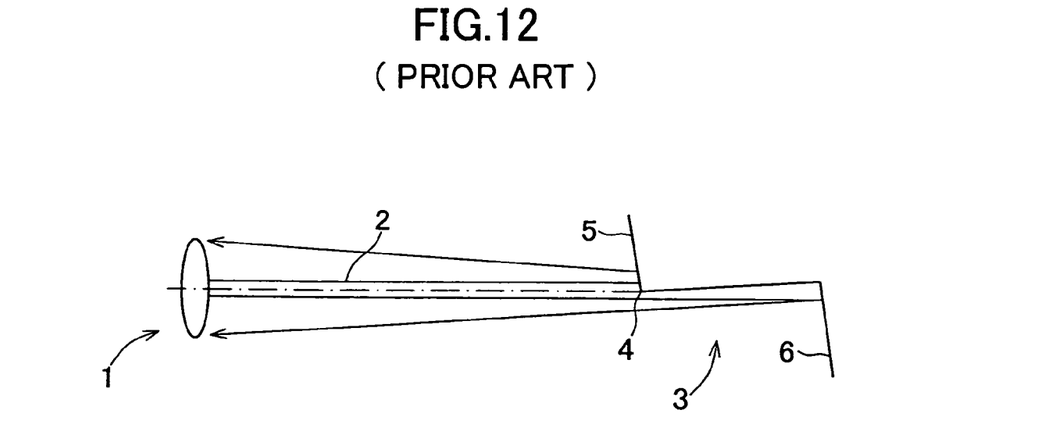
FIG. 12 is a drawing to explain a conventional example.

Further, as shown in FIG. 12, when the measuring point is an edge 4 of an object to be measured 3, a distance-measuring light 2 projected from a surveying instrument 1 is divided by the edge 4. A part of the light is reflected by a plane 5 containing the edge 4, and the other part of the light is reflected by a plane 6 beyond the edge 4. As a result, the surveying instrument 1 performs surveying operation based on a reflection light from the plane 5 before the edge 4 and based on a reflection light from the plane 6 beyond the edge 4. This causes a problem that accurate measurement cannot be made on the portion of the edge 4.

SUMMARY OF THE INVENTION

It is an object of the present invention to provide a surveying method and a surveying instrument, by which it is possible to extensively reduce number of measuring points and to reliably carry out measurement of an edge portion.

To attain the above object, the present invention provides a surveying method, which comprises a step of acquiring an image of a measurement range, a step of extracting edges by image processing of the image, a step of selecting measuring points on both sides of the edge from the image, and a step of performing surveying operation on the measuring points. Also, the present invention provides the surveying method as described above, comprising a step of excluding irregular edge data from the extracted edges. Further, the present invention provides the surveying method as described above, comprising a step of excluding edge data including fine alignment above a certain level is excluded from the extracted edges. Also, the present invention provides the surveying method as described above, further comprising a step of joining two or more image data based on the extracted edge data. Further, the present invention provides the surveying method as described above, wherein the edges to be extracted are two edges crossing each other, and the method further comprising a step of calculating an intersection of the edges, a step of selecting measuring points near the intersection, and a step of performing surveying operation on the measuring points. Also, the present invention provides the surveying method as described above, further comprising a step of surveying near the edge and near the edge intersection on the extracted edges, a step of calculating a plane surrounded by the edges, and a step of calculating surveying data of any desired point of the plane from the result of calculation. Further, the present invention provides the surveying method as described above, further comprising a step of storing by associating the calculated plane with the edge data.

Also, the present invention provides a surveying instrument, which comprises an optical system for collimating a measuring point, a driving unit for performing scanning in a measurement range of the optical system, a distance-measuring unit comprising a light wave distance measuring system, an image pickup unit for taking an image in the measurement range, an image processing unit for performing image processing to extract edges from the image picked up, and a control arithmetic operation unit for selecting a point near the edge as a measuring point on the image picked up and for controlling the distance-measuring unit to carry out surveying operation of the measuring point. Further, the present invention provides the surveying instrument as described above, wherein the edges to be extracted are two edges crossing each other, and the selected measuring point is near an intersection of the edges. Further, the present invention provides the surveying instrument as described above, wherein an area surrounded by edges is regarded as a flat plane, and a 3-dimensional coordinate value of the flat plane is calculated from the result of surveying of the measuring point near the edges. Also, the present invention provides the surveying instrument as described above, wherein there are at least two measuring points with the edge interposed therebetween. Further, the present invention provides the surveying instrument as described above, comprising a storage unit for storing a program for performing procedures to pick up the measurement range, to extract edges from the image picked up thus acquired, to select a point near the edge on the image picked up as a measuring point, and to perform surveying by scanning of the optical system in the measurement range. Also, the present invention provides the surveying instrument as described above, wherein a flat plane surrounded by the edges is calculated, and the storage unit stores the calculated plane associated with edge data.

According to the present invention, a surveying method is provided, which comprises a step of acquiring an image of a measurement range, a step of extracting edges by image processing of the image, a step of selecting measuring points on both sides of the edge from the image, and a step of performing surveying operation on the measuring points. As a result, it is possible to avoid the situation where the distance-measuring light is divided by edges and accurate measurement cannot be performed. This contributes to the improvement of reliability and accuracy of the measurement results.

Also, the present invention provides a surveying method, which further comprises a step of surveying near the edge and near the edge intersection on the extracted edges, a step of calculating a plane surrounded by the edges, and a step of calculating surveying data of any desired point of the plane from the result of calculation. Accordingly, it is possible to reduce the surveying process on a multiple of points on a plane surrounded by edges, and this provides advantages to promote economic feasibility of the surveying operation.

DETAILED DESCRIPTION OF THE PREFERRED EMBODIMENT

Description will be given below on the best mode to carry out the present invention referring to the drawings.

Figure 1:
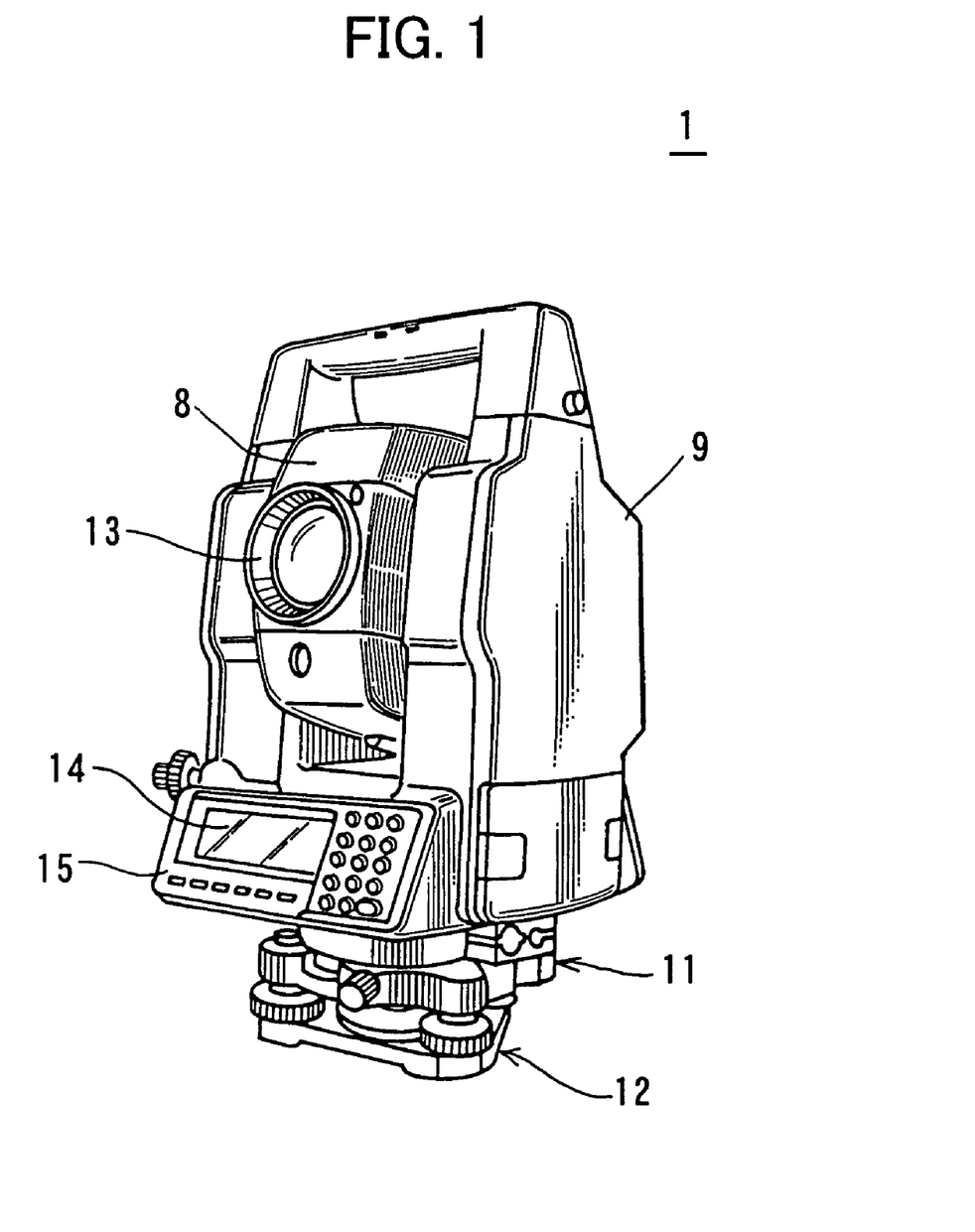
FIG. 1 is a perspective view of a surveying instrument according to an embodiment of the present invention.

FIG. 1 represents an external appearance of a surveying instrument (total station) according to the present invention. In the figure, a surveying instrument 1 comprises an electronic theodolite for detecting angles (vertical angle and horizontal angle) and a light wave distance-measuring system.

The surveying instrument 1 primarily comprises a telescope unit 8, a frame unit 9 for rotatably supporting the telescope unit 8 in upward and downward direction, a base unit 11 for rotatably supporting the frame unit 9 to rotate in horizontal direction, and a leveling unit 12 for supporting the base unit 11. The leveling unit 12 can be mounted on a tripod or the like.

An optical system including an objective lens 13, an image pickup unit, etc. are incorporated in the telescope unit 8. The frame unit 9 comprises a display unit 14 and an operation/input unit 15.

Figure 2:
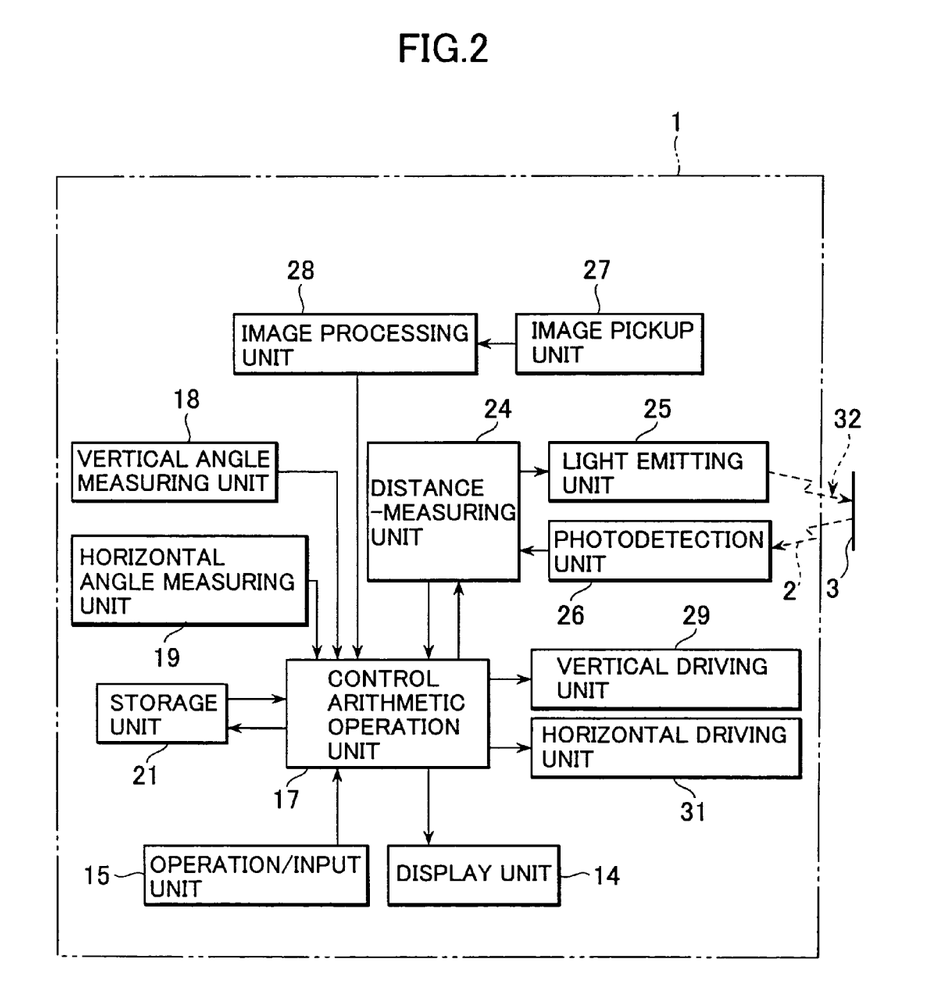
FIG. 2 is a schematical block diagram of an embodiment of the present invention.

Referring to FIG. 2, description will be given now on general arrangement of the surveying instrument 1.

In the figure, reference numeral 1 denotes the surveying instrument, and 3 denotes an object to be measured such as a wall surface or a corner cube surving as a measuring point.

The surveying instrument 1 mainly comprises a display unit 14, an operation/input unit 15, a control arithmetic operation unit 17, a vertical angle measuring unit 18, a horizontal angle measuring unit 19, a storage unit 21, a distance-measuring unit 24, a light emitting unit 25, a photodetection unit 26, an image pickup unit 27, an image processing unit 28, a vertical driving unit 29, a horizontal driving unit 31, an optical system 32, etc.

The vertical angle measuring unit 18 measures a vertical angle with respect to a horizontal line when the object to be measured 3 is collimated by the optical system 32, and the horizontal angle measuring unit 19 measures a horizontal angle of the object to be measured 3 with respect to a reference direction when a predetermined direction is defined as the reference direction. In the storage unit 21, various programs are stored, such as a sequence program for measurement, an image processing program for performing image processing, a program for calculating a straight line specified by at least two points based on measurement data at these points (distance, vertical angle, and horizontal angle) and for calculating a mathematical formula to indicate a flat plane on a 3-dimensional coordinate based on measuring data of at least three points. Further, surveying data from surveying operation and image data after image processing are stored. As the storage unit 21, various types of recording medium can be adopted such as FD, CD, DVD, RAM, ROM, hard disk, memory card, etc.

A measurement starting command or a measuring condition, etc. are inputted by a surveying operator from the operation/input unit 15 when distance measurement is performed. Measuring conditions during surveying operation, the result of surveying and an image taken during surveying operation, and the result of image processing are displayed on the display unit 14.

A distance-measuring light 2 is projected from the light emitting unit 25 toward the object to be measured 3. The photodetection unit 26 receives the distance-measuring light reflected by the object to be measured 3. Based on a photodetection signal from the photodetection unit 26, the distance-measuring unit 24 acquires a distance to the object to be measured 3, and inputs a distance signal to the control arithmetic operation unit 17.

The light emitting unit 25 is driven by the vertical driving unit 29 and the horizontal driving unit 31, and the light emitting unit 25 is directed toward the object to be measured 3.

At the control arithmetic operation unit 17, each of image signals (image data) inputted from the image processing unit 28 is associated with a vertical angle signal from the vertical angle measuring unit 18 when the image data is acquired. Each of image signals is also associated with a horizontal angle signal from the horizontal angle measuring unit 19, and with the distance signal from the distance-measuring unit 24 (surveying data at a collimation point for each image), and the results are stored in the storage unit 21. Further, the image data are associated with each other based on the surveying data for each image data.

The image data are associated with the surveying data. The associating of the image data with the surveying data is carried out by the method already known as follows: A recording area is prepared for each measuring point at the storage unit 21. An image data storage area and a surveying data storage area are further prepared within the recording area. Then, for each measuring point, the image data associated with the surveying data are recorded in the recording area. Or, an image data storage area and a surveying data storage area are prepared at the storage unit 21, and the image data and the surveying data are separately stored at the image data storage area and the surveying data storage area. Also, a management data is prepared to link the image data with the surveying data and to associate the image data with each other.

After the associating process between each image data has been completed, a joined image based on two or more images can be composed. Because a field angle of each image corresponds to an angle of view of the image pickup unit 27 and is already known, and because a point of collimation, i.e. the center of the image, is also already known in the surveying data stored, surveying data at any desired point of the joined image can be calculated from the surveying data of the collimation point and from the field angle in the image.

Figure 3:
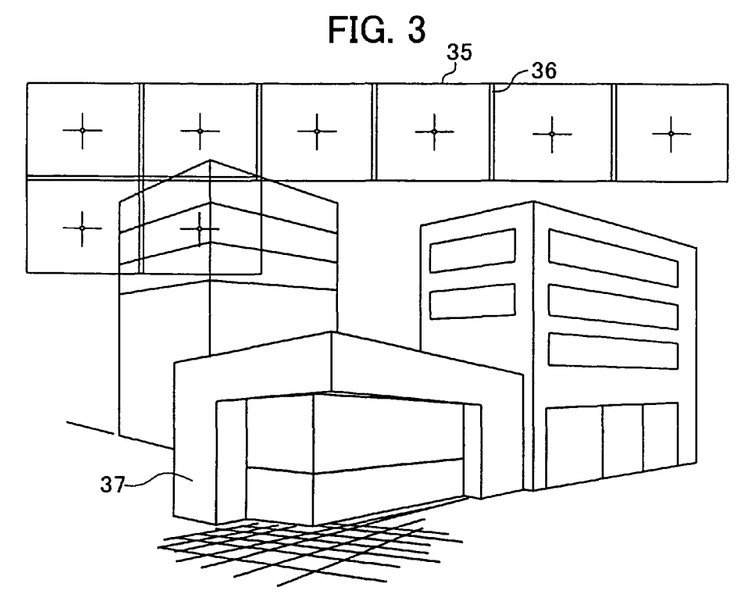
FIG. 3 is a drawing showing relation between a measurement range and divided images in the embodiment of the present invention.

When 3-dimensional surveying is performed by using the surveying instrument as described above, it is necessary to incorporate an image in a measurement range. In case the measurement range exceeds the range of field angle of the telescope, the image should be incorporated by dividing as shown in FIG. 3. The range to be divided and incorporated is determined by collimating two points on a diagonal line of a rectangle, for instance. In case a camera is provided, which can incorporate an image of wide angle, it is possible to specify the range on a display screen of the display unit 14.

The surveying instrument comprises the angle measuring means and the driving means. By changing the direction of collimation at a predetermined angle, the image is divided and automatically incorporated. Although the surveying instrument can divide the angle with high accuracy, it is preferable that the images are incorporated with some overlapping region 36, because the divided images 35 are combined and joined to make up a single image.

The image data acquired by image pickup is processed by image processing and edges are extracted. For edge extraction, edge enhancement is performed by using a spatial filter such as Laplacian, SOBEL, CANNY, etc. Laplacian edge enhancement is to enhance edge by using a differential image.

Figure 4:
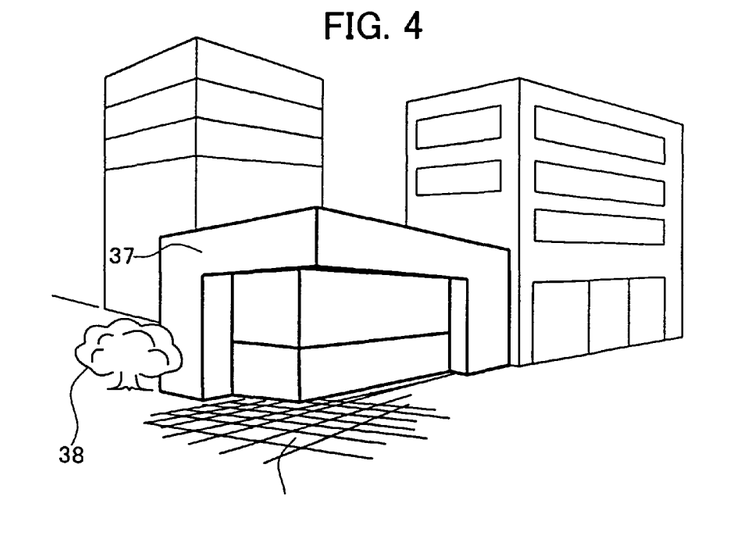
FIG. 4 is a drawing of an image, in which edges of an object to be measured are enhanced in an image of the measurement range in the embodiment of the present invention.

FIG. 4 represents an example of a drawing of edge enhancement. Corners of a building 37 are enhanced, and these are discriminated from planar portions such as walls and windows. However, edges are enhanced also for the other unnecessary data. For instance, these unnecessary data include a thicket 38, paving stones 39 and external patterns of the building. These are not needed as the data for the position and the height of the building. The thicket 38 and the paving stones 39, etc. are not associated with the surveying data but are left intact as images. External patterns of the building are associated as the data of planes surrounded by edges. The thicket 38 is a data with irregular edges and is relatively intelligible. Therefore, irregular edge data are excluded from the measurement data. The paving stones 39 and block patterns are regular and are difficult to differentiate from the other data, but the data of fine alignment above a certain level must be excluded from the measurement data.

Figure 5:
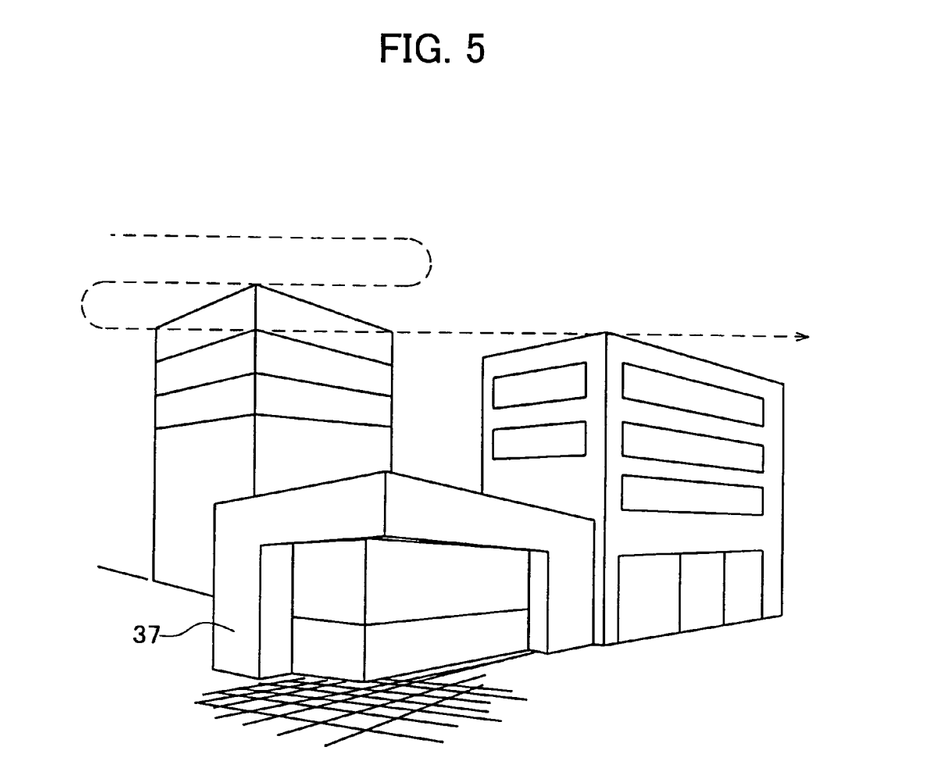
FIG. 5 is a drawing to show relation between the measurement range and scanning and measurement in the embodiment of the present invention.

FIG. 5 represents an aspect where the measurement range is scanned and measured. Measurement is performed at a predetermined pitch, and scanning is carried out on a predetermined range. For the scanning, portions without edges are already known in the edge processing, and scanning is not performed, and the scanning is done for the shortest distance. In case a straight edge is present, there are graded steps in many cases. By measuring a distance and a position on both sides of the edge, error can be eliminated by direct measurement of the edge portion.

For a straight line edge portion and an edge corner, the position of the edge portion can be identified because the positions of pixels to make up the image can be calculated from the image center and from the field angle. A corner 7 may be rounded, and it can be calculated as an intersection of straight line edges. The range surrounded by the straight line edges is a plane, which constitutes the external view of the building.

Figure 7:
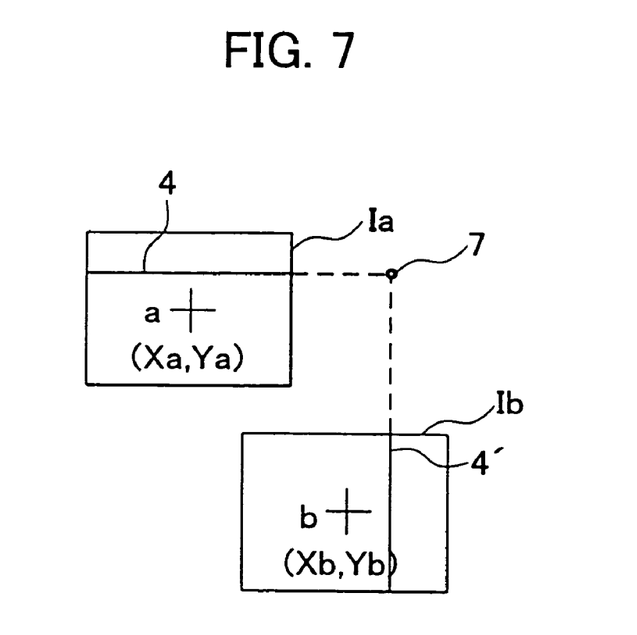
FIG. 7 is a drawing to show the measuring operation.

As shown in FIG. 7, an image data Ia obtained by image pickup is processed by image processing, and an edge 4 is extracted.

The control arithmetic operation unit 17 can determine a position near the edge 4 of the object to be measured 3 from the position of the edge 4 in the image, and the optical system 32 is driven and controlled so that the position of collimation will be near the edge 4 (at a position deviated by a beam diameter of the distance-measuring light). Surveying operation is performed by shifting the position of collimation with an optimal measuring point "a" (Xa, Ya) positioned near the edge 4. The distance-measuring light 2 is not divided by the edge 4 as shown in FIG. 12, and accurate surveying operation can be carried out. For the selection and the surveying of the optimal measuring point, appropriate points near the edge 4, e.g. two points near the edge 4 interposed between these points, are surveyed. By surveying two points near the edge 4 interposed between them, the position of the edge 4 can be clearly identified from the results of measurement.

Positional relation between the edge 4 and the optimal measuring point "a" (Xa, Ya) can be calculated from the image. By surveying at least two apart points along the edge 4, 3-dimensional measurement can be carried out on the edge 4.

Images of necessary portions including an edge 4', which perpendicularly crosses the edge 4 of the object to be measured 3, are taken, and an image data Ib is picked up (See FIG. 7). By image processing, the edge 4' is extracted, and surveying operation is performed by shifting the position of collimation with a point near edge 4' as an optimal measuring point "b" (Xb, Yb).

Further, from the edge 4 of the image data Ia, a linear equation La representing the edge 4 can be calculated, and a linear equation Lb representing the edge 4' can be calculated from the edge 4' of the image data Ib. The edge on the image data may be a straight line with variation caused by such as the variation of photodetection of pixels in the photodetection element. In this case, the straight line is calculated by a method such as least square method. From the results of surveying, the linear equations La and Lb on the 3-dimensional coordinate can be calculated.

Figure 6:
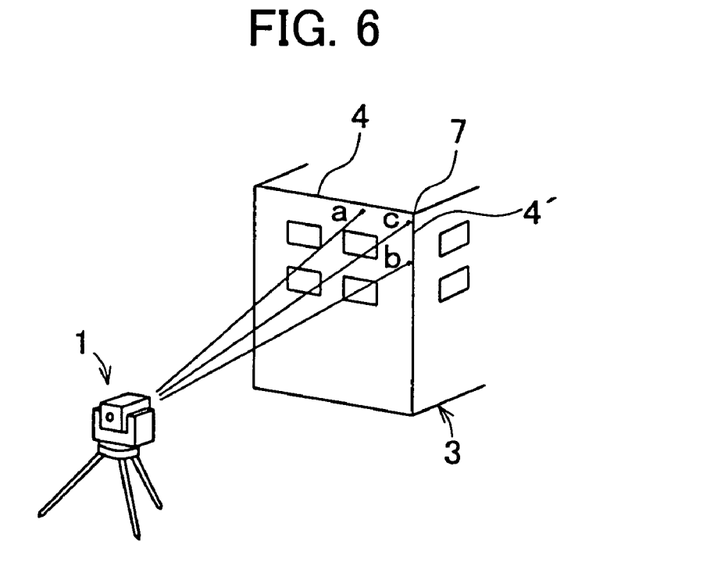
FIG. 6 is a drawing to show a measuring operation.
Figure 9:
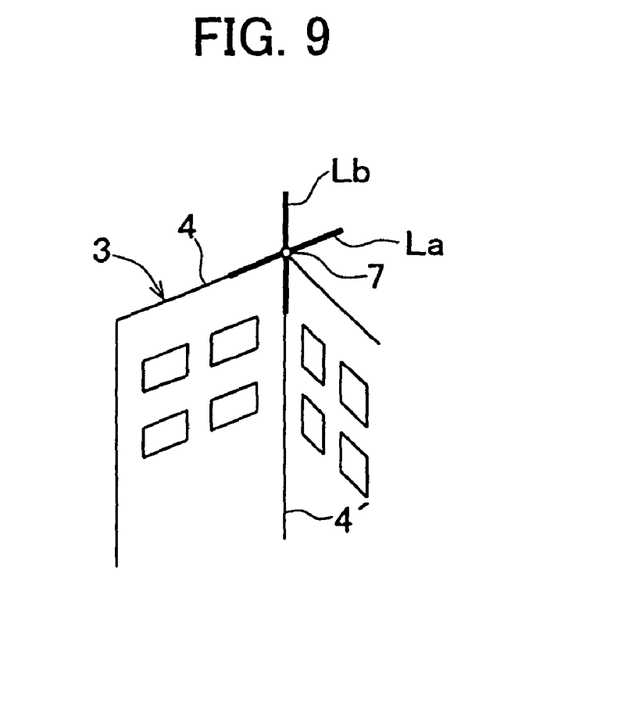
FIG. 9 is a drawing to show the measuring operation.

An intersection of the linear equation La with the linear equation Lb is calculated, and the point obtained by the calculation represents the position of the corner 7 of the object to be measured 3 (See FIG. 6 and FIG. 9). A position deviated from the corner 7 of the object to be measured 3 by the diameter of the beam is defined as an optimal measuring point "c" (Xc, Yc), and the optical system 32 is directed toward the optimal measuring point "c" (Xc, Yc).

Figure 8:
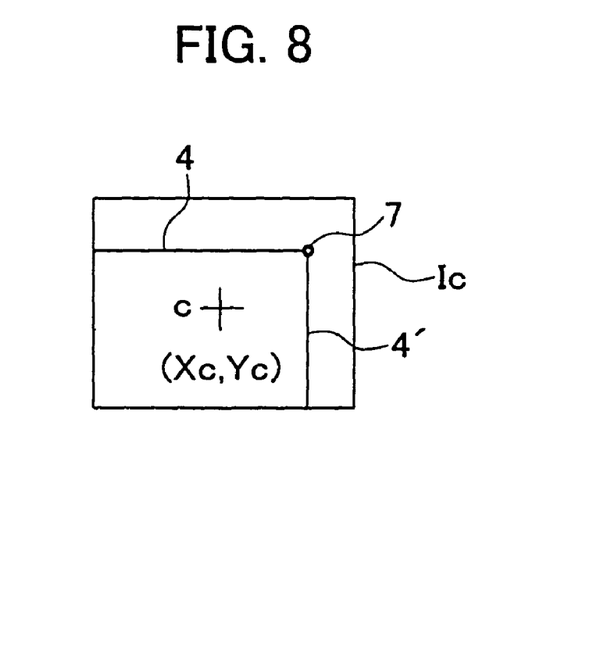
FIG. 8 is a drawing to show the measuring operation.

As shown in FIG. 8, when an image data Ic including the corner 7 of the object to be measured 3 can be picked up, the position of the corner 7 on the image can be immediately determined by edge extraction through image processing of the image data Ic, and the optimal measuring point c (Xc, Yc) near the corner 7 can be determined.

Thus, accurate measurement can be performed on the optimal measuring point a (Xa, Ya) near the edge 4, the optimal measuring point b (Xb, Yb) near the edge 4', and the optimal measuring point c (Xc, Yc) near the corner 7.

By extracting all edges of the object to be measured 3, by surveying and calculating adequate positions near the edges, and by acquiring surveying data of each edges, a 3-dimensional contour of the object to be measured 3 can be determined. A series of operations as given here are executed according to a surveying sequence program, which has been stored into the storage unit 21 by the control arithmetic operation unit 17.

In general, a building consists of planes. Thus, a plane including two edges can be calculated from at least two edges (straight lines representing edges). Accordingly, 3-dimensional measurement of the object to be measured 3 can be made by extracting and surveying the edges of the object to be measured 3.

Figure 10:
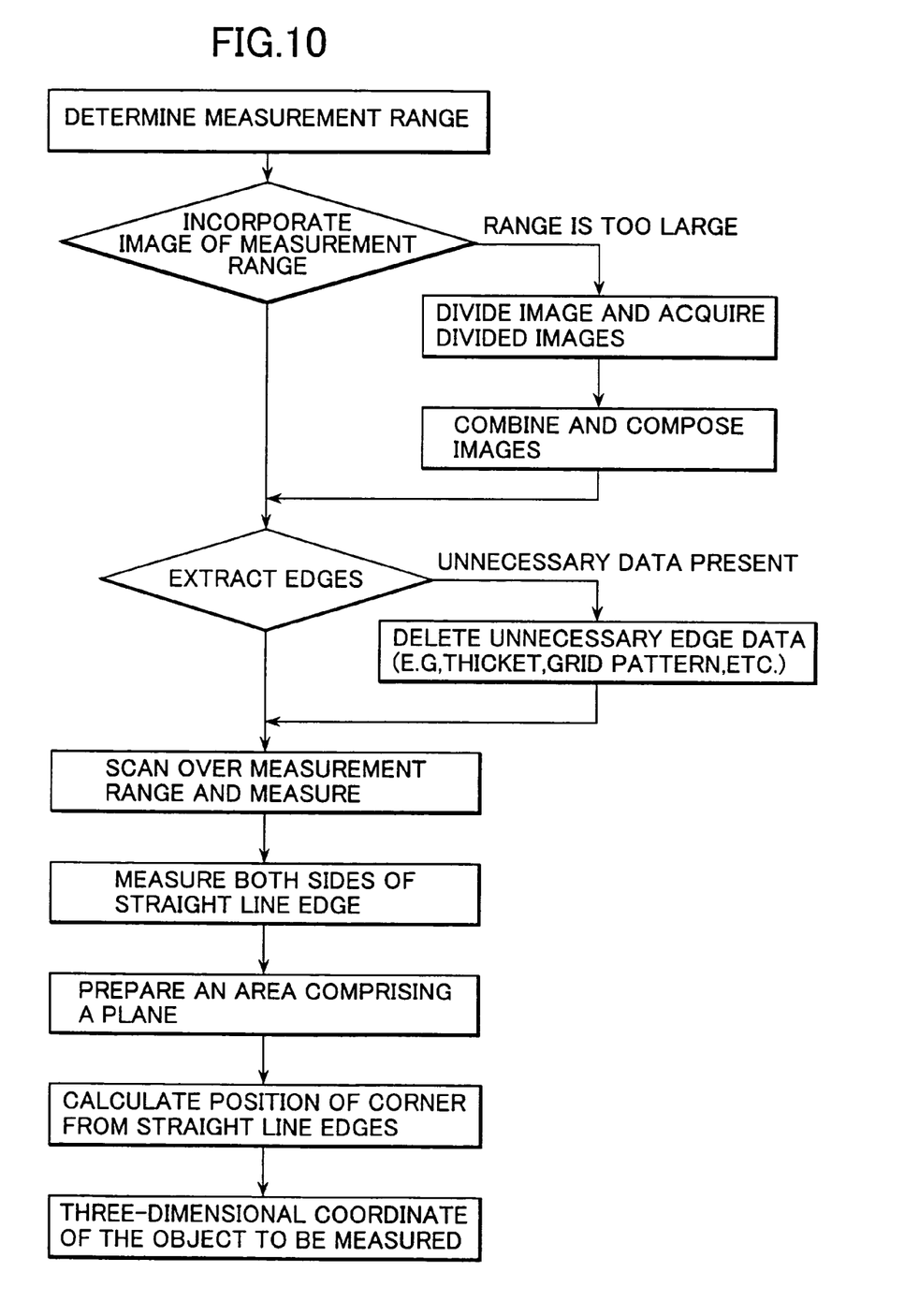
FIG. 10 is a flow chart to explain the measuring operation.

Description will be given below on 3-dimensional measurement referring to FIG. 10 and FIG. 11.

A measurement range is determined, and an image in the measurement range is incorporated.

It is judged whether the measurement range is larger than the field angle of the image pickup unit 27 or not. If it is larger, the measurement range is divided, and images are acquired. Further, the images are combined and joined.

Edge processing is performed on the images, and edges are extracted. On the edges thus extracted, it is judged whether there is unnecessary data or not. If there is unnecessary data, unnecessary edge data is deleted. Unnecessary data includes irregular edge data, or edge data of finer alignments above a certain level by comparing with the scale of the object such as building.

The measurement range is scanned and measured. Further, a position of the straight line edge on the image is calculated. Measurement (distance measurement and angle measurement) is performed on both sides interposing the straight line edge therebetween.

By the measurement of the edges, an area surrounded by the edges is identified, and a plane made up by the area can be identified.

A position of a corner can be determined by an intersection of straight line edges, which cross each other. The position of the corner on the image is calculated, and the corner can be measured.

By measuring the straight line edges and corners, 3-dimensional data (3-dimensional coordinate) of the object to be measured 3 can be obtained.

Figure 11:
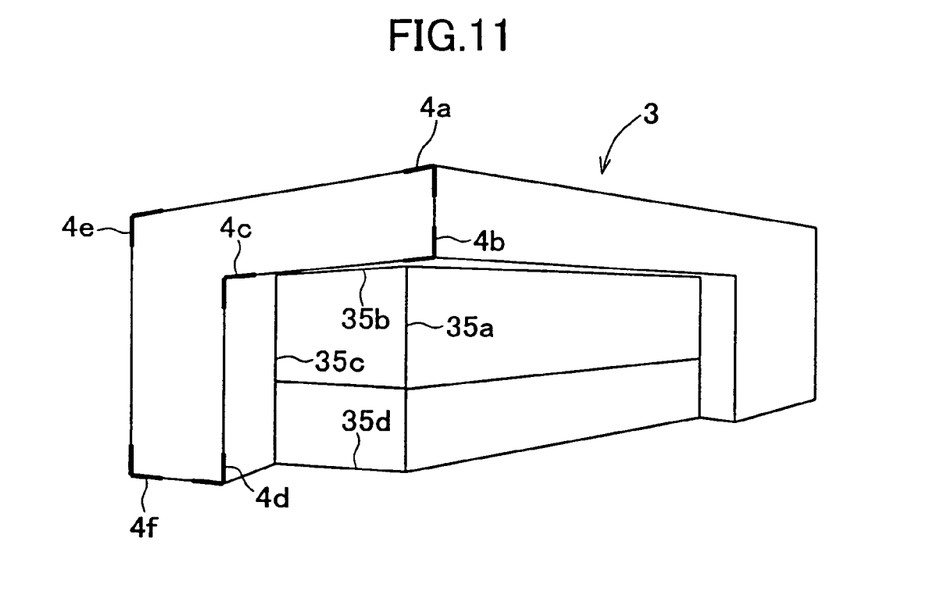
FIG. 11 is a drawing to explain the measuring operation.

Referring to FIG. 11, description will be given now on a case where surveying operation is performed on the object to be measured 3, for instance, by using a building 37 within the measurement range shown in FIG. 4 as the object to be measured 3.

A measurement range is determined, and an image of a portion including the object to be measured 3 is incorporated. Edges 4a, 4b ..., 4f are extracted from the image, and measurement by scanning is carried out.

Also, surveying is performed on both sides of the edges 4a, 4b ..., 4f. The results of surveying of the edges 4a, 4b ..., 4f and a straight line representing the edges 4a, 4b ..., 4f are obtained. Further, intersections (positions of corners) of the edges 4a, 4b ..., 4f are determined. Then, an area of a plane surrounded by the edges 4a, 4b ..., 4f is calculated.

Thus, 3-dimensional measurement of an area of a plane surrounded by the edges 4a, 4b ..., 4f including corners can be carried out.

Similarly, 3-dimensional measurement is performed on a plane, which is surrounded by edges 35a, 35b, 35c and 35d. By carrying out 3-dimensional measurement on a plane surrounded by the edges sequentially, it is possible to perform 3-dimensional measurement (i.e. calculation of 3-dimensional coordinate) of the object to be measured 3.

Surveying operation may be carried out at least near edges and near corners. This contributes to extensive reduction of the measuring points and considerable reduction of the storage capacity of the storage unit 21 and of the burden on the control arithmetic operation unit 17 to perform the calculation necessary for surveying operation.

Next, the image data is associated with surveying data and is stored in the storage unit 21. Because the image data are associated with each other via the surveying data, a joined image can be formed based on a plurality of image data. Based on the calculation of 3-dimensional coordinate, a 3-dimensional image can be formed. Thus, it is possible to visually identify the result of 3-dimensional measurement, and surveying data at any point as desired on the image can be obtained by calculation. Joining of image data can be carried out based on the edge data thus obtained.

As described above, a position and a height of a building or a construction or a construction site can be identified from intersections of edges and distance-measuring angle of the points between the edges. By associating positions thus identified on the image, the data for 3-dimensional measurement with the image is obtained. This makes it possible to display a 3-dimensional image on a 2-dimensional screen such as a display unit, and to promptly obtain a position specified on the image.

What is claimed is:

1. A surveying method, carried out with a surveying instrument which has a measuring unit for performing a light wave distance measurement and an angle measurement, an image pickup unit for taking an image in a measurement range, and an image processing unit for performing image processing, comprising a step of acquiring an image of a measurement range, a step of extracting edges by image processing of said image, a step of selecting measuring points at a position deviated by a beam diameter of a distance measuring light from each of said extracted edges on both sides of each said edge from said image, a step of performing surveying operation on said measuring points by projecting a distance measuring light on said measuring points and receiving a reflected light from said measuring points, and a step of calculating 3-dimensional data of each said edge based on the results of surveying of said measuring points.

2. A surveying method according to claim 1, comprising a step of excluding irregular edge data from said extracted edges.

3. A surveying method according to claim 1, comprising a step of excluding edge data including fine alignment above a certain level from said extracted edges.

4. A surveying method according to claim 1, further comprising a step of joining two or more image data based on the extracted edge data.

5. A surveying method according to claim 1, wherein said edges to be extracted include two edges crossing each other, and said method further comprising a step of calculating an intersection of said two edges crossing each other, and wherein said measuring points selected are points near said intersection, and wherein said surveying operation is performed on said measuring points near said intersection.

6. A surveying method according to claim 5, further comprising a step of surveying near said two edges crossing each other and near the edge intersection, a step of calculating a plane surrounded by said edges, and a step of calculating surveying data of any desired point of said plane from the result of said plane calculation.

7. A surveying method according to claim 6, further comprising a step of storing the data obtained by associating the calculated plane with the edge data.

8. A surveying instrument, comprising an optical system for collimating a measuring point, a driving unit for performing scanning in a measurement range said optical system, a distance-measuring unit comprising a light wave distance measuring system and an angle measuring unit, an image pickup unit for taking an image in the measurement range, an image processing unit for performing image processing to extract edges from the image picked up, and a control arithmetic operation unit for selecting two or more points deviated by a beam diameter of a distance measuring light from each said extracted edge as measuring points on the image picked up, for driving said optical system via said driving unit, for projecting a distance measuring light on said measuring points for controlling said distance-measuring unit to carry out surveying operation of said measuring points by receiving a reflected light from said measuring points and for calculating the 3-dimensional position of each said edge based on the results of surveying of said measuring points.

9. A surveying instrument according to claim 8, wherein said edges to be extracted include two edges crossing each other, and one of said selected measuring points is near an intersection of said two edges crossing each other.

10. A surveying instrument according to claim 8, wherein an area surrounded by edges is regarded as a flat plane, and a 3-dimensional coordinate value of said flat plane is calculated from the result of surveying of said measuring points deviated by a beam diameter of a distance measuring light from said edges.

11. A surveying instrument according to claim 8, wherein there are at least two measuring points with said edge interposed therebetween.

12. A surveying instrument according to claim 8, further comprising a storage unit for storing a program for performing procedures to pick up the measurement range, to extract said edges from the image picked up thus acquired, to select a point near each of said extracted edges on the image picked up as a measuring point, and to perform surveying by scanning of the optical system in said measurement range.

13. A surveying instrument according to claim 10, wherein a flat plane surrounded by said edges is calculated, and the storage unit stores the calculated plane associated with edge data.

* * * * *